United States Patent [19]

Wästerberg

[11] Patent Number: 4,583,771
[45] Date of Patent: Apr. 22, 1986

[54] CONCRETE PIPE

[76] Inventor: Gunnar K. Wästerberg, Stafettgatan 123, S-273 00 Tomelilla, Sweden

[21] Appl. No.: 523,529

[22] Filed: Aug. 16, 1983

[30] Foreign Application Priority Data

Aug. 18, 1982 [SE] Sweden .................................. 8204742

[51] Int. Cl.⁴ ............................................. F16L 49/00
[52] U.S. Cl. .................................. 285/230; 285/288; 285/347; 138/175; 264/259
[58] Field of Search .............. 285/230, 288, 347, 55; 277/207 A; 138/175, 176, 96 R

[56] References Cited

U.S. PATENT DOCUMENTS

| 779,169 | 1/1905 | MacDonald | 285/55 |
|---|---|---|---|
| 2,416,618 | 2/1947 | Ferla | 285/288 X |
| 2,615,741 | 10/1952 | Nathan | 277/207 A X |
| 3,015,510 | 1/1962 | Bates | 277/207 A X |
| 3,217,077 | 11/1965 | Cocke | 285/288 X |
| 3,403,206 | 9/1968 | Thomas et al. | 138/96 R X |
| 3,729,939 | 5/1973 | Shimizu | 285/230 X |
| 3,738,689 | 6/1973 | Forni | 285/288 X |
| 3,767,232 | 10/1973 | Smith | 285/230 X |
| 3,780,773 | 12/1973 | Haugen | 138/96 R |
| 4,186,931 | 2/1980 | Anderson | 285/230 X |
| 4,394,025 | 7/1983 | Anderson | 285/230 X |

FOREIGN PATENT DOCUMENTS

| 35774 | 5/1973 | Australia | 285/230 |
|---|---|---|---|
| 644497 | 7/1962 | Canada | 285/288 |
| 2740421 | 3/1979 | Fed. Rep. of Germany | 138/96 R |

Primary Examiner—Thomas F. Callaghan
Attorney, Agent, or Firm—Sheridan Neimark; Karl W. Flocks

[57] ABSTRACT

A concrete pipe has a socket end and a spigot end which consists of an annular cap made of plastic material and having an inner wall with an inner diameter corresponding to the inner diameter of the pipe, an outer wall with an outer diameter smaller than the outer diameter of the pipe, and a web portion interconnecting the walls and forming the spigot end surface of the pipe. A portion for accommodating a sealing ring is disposed around the outer wall of the cap, and the cap is joined to the pipe by being axially pressed down over the pipe end so that the concrete fills out the space between the cap walls.

3 Claims, 3 Drawing Figures

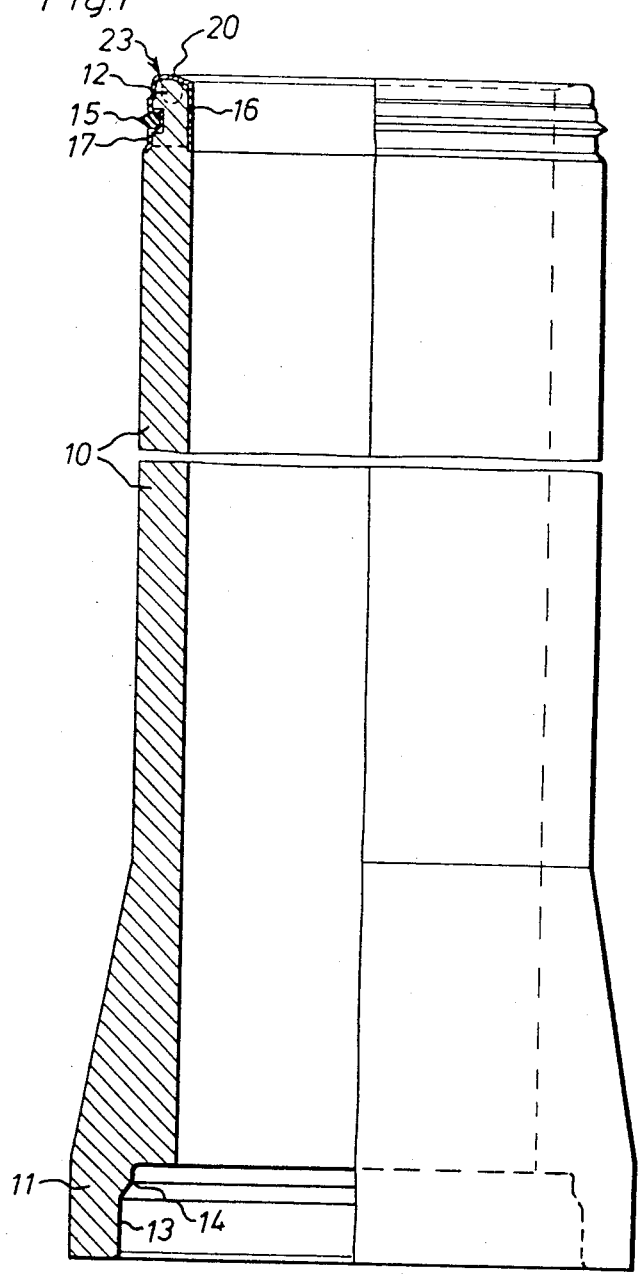

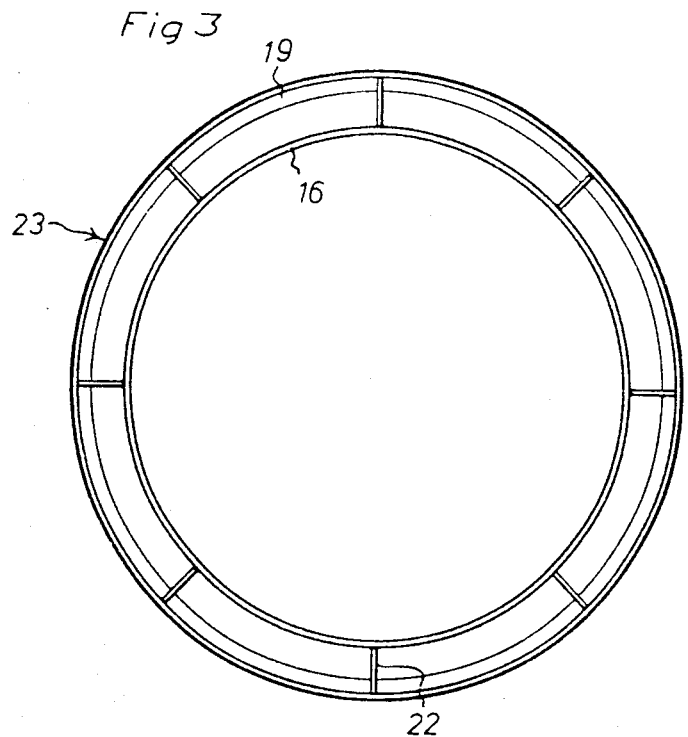
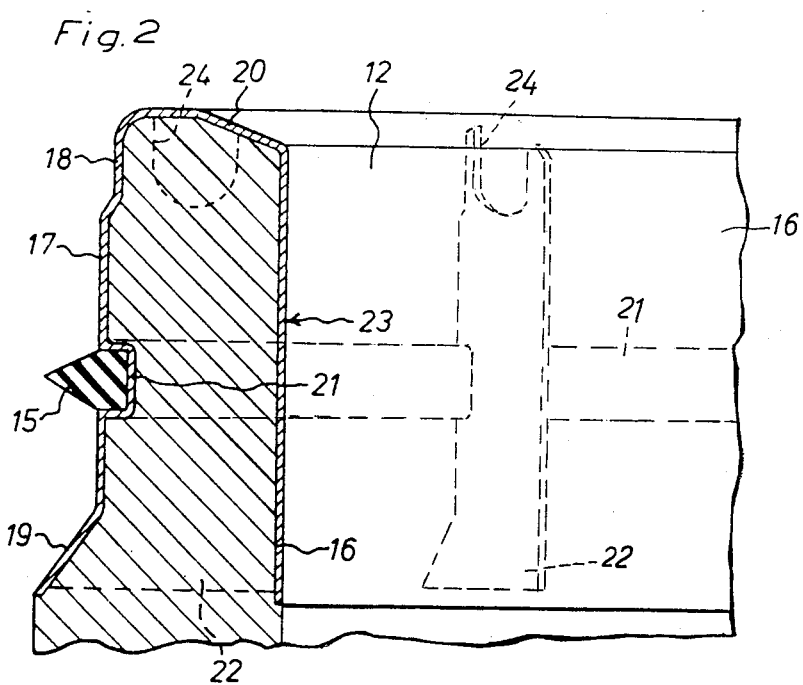

CONCRETE PIPE

The present invention relates to a concrete pipe having a socket end and a spigot end, and to a method for the production of said concrete pipe.

Today, concrete pipes with socket and spigot ends and intended for rubber ring sealing usually are manufactured by filling concrete into a mold comprising an outer mold and a core and to vibrate the concrete in the mold to a hardness which makes it possible to remove the pipe from the mold after final vibration. To form the socket end of the pipe, a so-called socket ring is positioned in the mold and retained in the formed pipe until the concrete has set (after about 24 hours). The socket ring is made of steel and has a considerable dimensional stability, which means that ovalness and warping seldom occur at this pipe end. To produce the spigot end, a profiled ring is pressed and rotated down into the concrete. A number of difficulties are associated with this production technique. First of all, the consistency of the fresh concrete must be absolutely correct because, if the fresh concrete is too wet, the profiled ring will stick fast in the concrete so that, when the ring is lifted, the entire spigot end will be torn off. If, on the other hand, the fresh concrete is too dry, the surface will be porous so that leakage may occur after the pipe has been connected with another pipe. Furthermore, because the profiled ring is rotated under pressure in the concrete, considerable wear occurs, which means poor dimensional stability or high costs because the profiled ring must frequently be replaced. Another disadvantage is that the spigot end practically always becomes oval upon removal of a wet concrete pipe because the spigot has no support (as is the case with the socket ring) during removal from the mold. This ovalness must be subsequently adjusted, and this is done by means of outer and inner supporting caps. This work must be carried out with great accuracy and takes time, but is absolutely necessary because otherwise the pipe will remain oval at the spigot end and must be discarded. Because the spigot end is sensitive to ovalness, the spigot measure must always be checked.

Unlike the socket, the spigot is positioned on the outer side of the pipe, and this means that the pipe must be very carefully handled during stacking, loading and unloading and bedding in a trench. It is difficult to estimate the total scrappage, but 3–4% is no exaggeration. Leakage frequently occurs because use is made of pipes with broken spigot ends that should actually have been rejected.

Because of the low dimensional stability of the spigot end, present-day pipe manufacturers employ comparatively thick rubber rings for sealing concrete pipes, for example a 13.5 mm thick rubber ring for a pipe having a diameter of 225 mm. To obtain the desired rubber ring seal, the ring must be placed in absolutely correct position, and to this end the rubber ring is placed right out on the spigot end on which it is then rolled down through half a turn upon insertion of the spigot end into the socket end. Should the rubber ring not make this half-turn, the rubber ring will not take up the correct position, and as a result leakage will occur at the joint, and this again will result in highly expensive re-laying of pipe sections. This is a problem which is frequently encountered and which usually is due to carelessness in cleaning the spigot and socket ends from gravel, ice etc., incorrect mounting of the rubber ring or incorrect insertion of the spigot into the socket upon laying of pipe sections.

Recently, a pipe has been developed which has a fixed rubber ring cast into the socket end. The object of this arrangement is to obtain an exact position for the rubber ring and to ensure that all pipes are laid with rubber rings; there have been instances where pipes have been laid without rubber rings, for example when the rubber rings have not been delivered together with the pipe or in an insufficient number. Another advantage of the new construction is that, together with the rubber ring, a heat-insulating layer of expanded plastic, such as expanded polystyrene, which protects against, inter alia, gravel and ice, is cast into the socket end. This heat-insulating layer is simply torn off when the pipe is laid.

However, the last-mentioned pipe suffers from the disadvantage that the production cost rises considerably due to inefficient production techniques; an increase in cost for each pipe by about 50% has been established. Furthermore, the cost rises because the rubber ring has a complicated shape and because the socket end is thicker. For the new construction, the interest has been concentrated entirely on the socket end, while the difficulties encountered at the spigot end have been left out of consideration.

The object of the present invention is to provide a concrete pipe of the above-mentioned type where the socket end is formed substantially by conventional technique, while the spigot end is made in accordance with a novel method for removing the above-mentioned shortcomings. To achieve this object, the spigot end is formed of an annular cap of plastic material having an inner wall whose inner diameter corresponds to the inner diameter of the main part of the pipe, and outer wall whose outer diameter maximally corresponds to the outer diameter of said main part of the pipe, a web interconnecting the cap walls and forming the spigot end surface of the pipe, and a portion adapted to accommodate a sealing ring on the outer side of the cap outer wall, said cap having an axial length which maximally corresponds to the depth of the spigot-receiving portion of the socket end.

The invention also relates to a method of making such a concrete pipe, in which method concrete is filled into a mold which consists of a core, an outer mold part coaxially surrounding said core, and a socket ring to form the socket end of the pipe, the concrete is vibrated, the spigot end of the pipe is produced, and the mold is stripped from the pipe. The method according to the invention is characterized in that the spigot end of the pipe is produced by axially pressing over the pipe an annular cap filling out the space between the core and the outer mold part and having an inner wall, an outer wall, a web interconnecting said walls, and a portion accommodating a sealing ring on the outer side of the outer wall, such that the concrete fills out the space between the cap wall.

The concrete pipe according to the invention has the considerable advantage that conventional production equipment can be readily and inexpensively adapted to the production of the concrete pipe. The above-mentioned wear does not occur when the cap is pressed over the pipe, and the spigot end will have excellent dimensional stability so that scrappage due to ovalness and broken spigot ends is avoided. The rubber ring can be mounted in connection with the production of the pipe and securely fixed in position, whereby the risk of forgotten rubber rings is eliminated. Furthermore, the pipe according to the invention can be produced in a shorter time than a conventional pipe and, in spite of the cap, will be less expensive.

The invention will now be described in detail below, reference being made to the accompanying drawings illustrating an embodiment of the invention. In the drawings FIG. 1 is a vertical projection, partly in section, of a concrete pipe produced in accordance with the invention;

FIG. 2 is a sectional view of part of the spigot end of the pipe shown in FIG. 1; and FIG. 3 shows from below a cap forming the spigot end.

FIG. 1 shows a concrete pipe according to the invention. The concrete pipe comprises a cylindrical main part 10 having at one end a socket 11 and at its other end a spigot 12 adapted to be inserted in the socket of an identical pipe. The socket 11 is formed in conventional manner with a portion flaring towards the end and has a cylindrical recess 13 in the end for receiving a spigot. Adjacent the bottom of the recess 13 the wall of the recess has a convex annular portion 14 to form a bead adapted to restrict transverse movement of the spigot end inserted in the recess 13. The pipe spigot 12 consists of a cap 23 of plastic material which is pressed over the pipe end such that the concrete will fill the space between the walls 16, 17 of the cap 23 and the web 20 interconnecting said walls and forming the spigot end surface of the pipe. On the outer side of the cap, a rubber ring 15 is fixed in a recess provided for this purpose.

The pipe shown in FIG. 1 is produced by filling concrete into a mold which comprises a core, an outer mold part coaxially surrounding said core, and a socket ring at the very bottom of the mold to form the pipe socket end. After concrete has been filled into the mold, the concrete is vibrated in conventional manner, whereupon the spigot end is produced. According to the invention, the ring which is used in the conventional mold and which has a pointed profiled is replaced by a thrust ring on which a cap 23 is fixed, for instance by vacuum applied through holes in the thrust ring. As will appear from FIGS. 1 and 2, the cap 23 is annular and has a cross-section in the form of a U turned upside-down and having an inner wall 16, an outer wall 17 and a web 20 interconnecting said walls. The inner wall 16 has an inner diameter corresponding to the outer diameter of the mold core, while the outer diameter of the outer wall 17 is smaller than the inner diameter of the outer mold part over the major part of its length but assumes the last-mentioned diameter adjacent its end facing away from the web 20 by means of an outwardly inclined collar 19, as is clearly seen from FIG. 2. The outer wall 17 has a circumferential groove 21 in its outer side to accommodate a sealing ring of rubber or the like. The thrust ring provided with the annular cap is pressed axially against the upper end of the mold so that the outer side of the inner wall 16 of the cap 23 is displaced along the outer side of the mold core. The cap 23 is pressed down over the pipe end until the concrete has completely filled the space between the cap walls 16, 17 and the web 20. To further stabilize the cap 23, the cap is provided with stiffenings 22 in the form of disc-shaped means extending between the walls 16 and 17 and made in one piece therewith. As will appear from FIG. 3, the disc-shaped means 22 are radially and axially oriented and do not obstruct the downward movement of the cap on the pipe end. The disc-shaped means 22 are provided at their upper ends with an approximately semicircular hole 24 through which the concrete can flow and extend substantially the entire axial length of the cap. As will appear from FIG. 2, the cap 23 is provided in its outer wall adjacent the web 20 with a slight depression 18 adapted to receive the socket bead 14 shown in FIG. 1.

After the cap 23 has been pressed onto the pipe end, the mold can be stripped, i.e. the core and the outer mold part are removed while, as has been indicated above, the socket ring is retained within the pipe until the latter has set.

The cap 23 preferably is made of impact-resistant thermosetting plastic by injection molding but may, of course, also be made of metal. It can be produced to close tolerances, for which reason, as has been pointed out above, the ovalness is eliminated and the time-consuming checking of measurements will be superfluous. The cap 23 can be mounted in a shorter time than by conventional spigot production technique, and since no inner and outer supporting caps are required, the production is highly efficient. Furthermore, the above-mentioned wear is eliminated because the cup is no longer rotated but merely axially pressed down into the concrete.

The sealing ring 15 may be of simple construction, and because the ring is mounted in advance, there is no risk that it will be forgotten. The drawing shows and approximately rectangular groove for accommodating the ring, but it may also be sufficient to provide a shoulder against which the ring is placed for bringing it into correct position. Preferably, the rubber ring 15 is secured by an adhesive, but other methods of securing the ring are also conceivable; for example, the groove 21 and the side of the ring 15 facing the groove can be dove-tailed, and the ring preferably is mounted at the location where the cap is produced. Naturally, it is also possible to mount the sealing ring after the cap has been joined with the concrete pipe. On mounting of the sealing ring, a protective tape preferably is provided on the outer side of the cap 23 to protect the cap and the sealing ring.

As will be evident from the above, the invention makes it possible to produce an extremely advantageous concrete pipe which is superior to the conventional concrete pipe, but still can be produced at lower cost.

What I claim and desire to protect by Letters Patent is:

1. A concrete pipe, especially for sewers consisting essentially of a spigot end, a socket end with a portion for receiving the spigot end of an adjacent identical pipe, and a cylindrical pipe main part located between said spigot and socket ends, the spigot end being formed of an annular cap of plastic material having an inner wall whose inner diameter corresponds to the inner diameter of the main part of the pipe, an outer wall whose outer diameter maximally corresponds to the outer diameter of said main part of the pipe, a web interconnecting the cap walls and forming the spigot end surface of the pipe, and a portion adapted to accommodate a sealing ring on the outer side of the cap outer wall, said cap having an axial length which maximally corresponds to the depth of the spigot-receiving portion of the socket end, wherein the cap has radially and axially oriented reinforcing walls extending between the walls for substantially the entire axial length of the cap and made in one piece therewith.

2. A concrete pipe as claimed in claim 1, wherein the portion adapted to accommodate a seal is a groove in which a sealing ring can be secured.

3. A concrete pipe as claimed in claim 1, wherein the outer wall of the cap has a first approximately cylindrical portion located adjacent the web and having an outer diameter which is smaller than the outer diameter of the pipe main part, said cylindrical portion being formed with the portion for accommodating the sealing ring and, at its end facing away from said web, flaring to the outer diameter of the pipe main part by means of an outwardly inclined collar.

* * * * *